Patented June 6, 1950

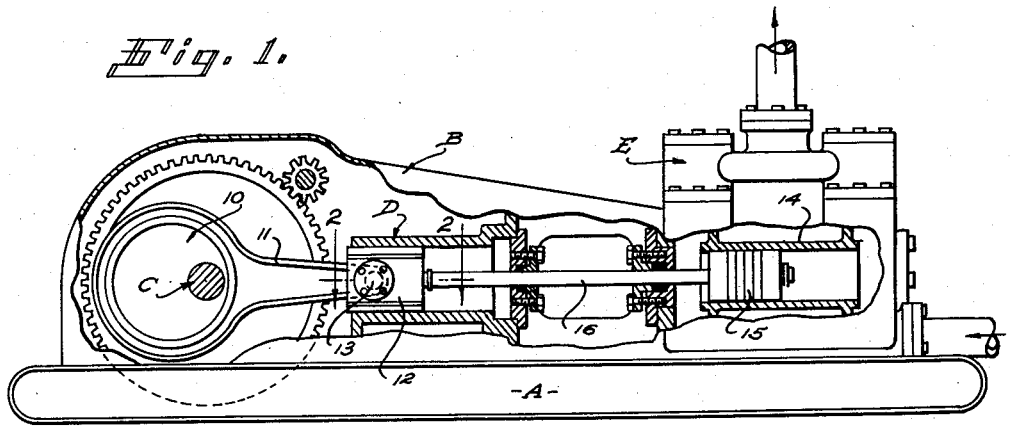
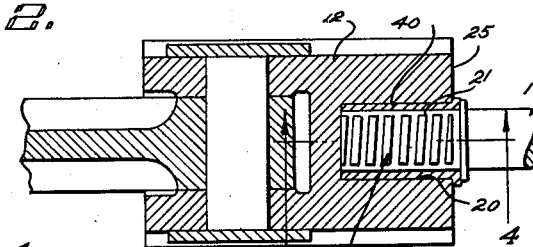
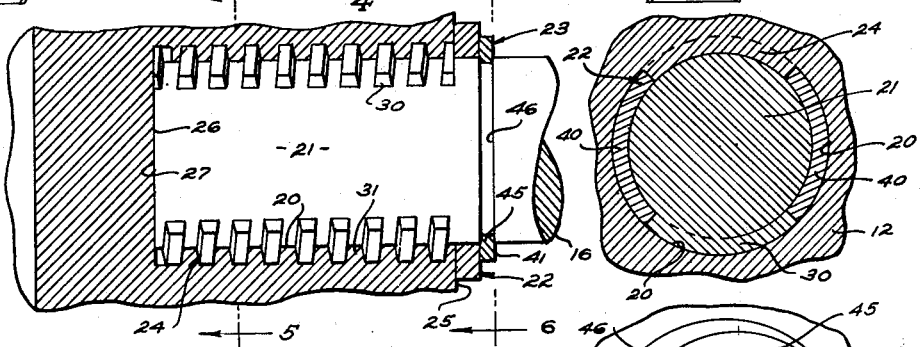
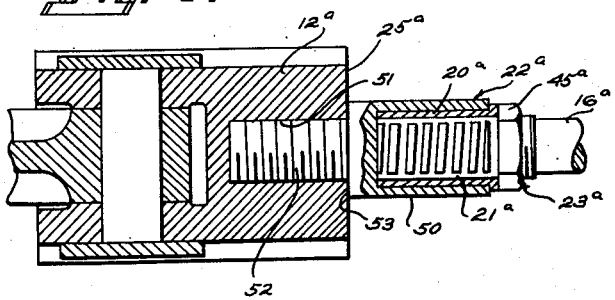
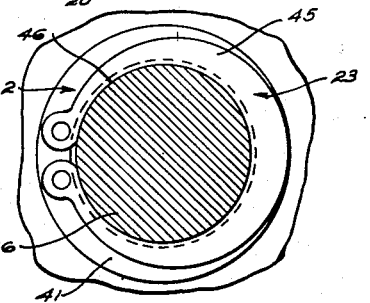

2,510,377

UNITED STATES PATENT OFFICE 2,510,377

CROSSHEAD CONNECTION FOR SLUSH PUMPS

Charles J. Carr, Long Beach, Calif.

Application October 11, 1948, Serial No. 53,942

2 Claims. (Cl. 103—202)

This invention has to do with a cross head connection for slush pumps and it is an object of the invention to provide a simple, secure, easily engaged connection between a pump or piston rod and a cross head of a pump.

Pumps such as are commonly known as slush pumps generally include a crank mechanism that operates a cross head and the cross head is coupled with a pump piston by a connecting rod. In the usual pump construction the piston rod is connected to the cross head by a threaded connection made secure by a lock nut and in practice such connection is often difficult and slow to engage or disengage. Such connection must be made tight in order to be secure, and when made tight it is likely to become set and very difficult to release. Further, the connection between a pump rod and cross head is so located as to be more or less inaccessible, with the result that it is not easily manipulated either for the purpose of engaging the connection or for releasing it.

It is a general object of this invention to provide a connection between a cross head and piston rod by which these parts are securely coupled or engaged, which connection is simple and inexpensive of manufacture and is such that it can be very easily and quickly engaged or released.

It is another object of the present invention to provide a connection of the general character referred to which when engaged is tight or firm, the structure being such that there is no looseness or play in the connection once it is properly established.

It is another object of the present invention to provide a connection of the character referred to including few simple parts which are easily manufactured and which are simple and convenient to handle.

The various objects and features of my invention will be fully understood from the following detailed description of typical preferred forms and applications of the invention, throughout which description reference is made to the accompanying drawings, in which:

Fig. 1 is a side view of a typical slush pump with parts broken away to illustrate the portions of the structure to which the present invention is applied. Fig. 2 is an enlarged plan section taken as indicated by line 2—2 on Fig. 1. Fig. 3 is a perspective view of the structure employed in the lock means which acts to lock the connection established between the rod and cross head. Fig. 4 is an enlarged detailed view taken in the direction indicated by line 4—4 on Fig. 2, showing the cross head in section and the piston rod in elevation. Fig. 5 is a transverse sectional view taken as indicated by line 5—5 on Fig. 4. Fig. 6 is a transverse sectional view taken as indicated by line 6—6 on Fig. 4, and Fig. 7 is a view similar to Fig. 2 showing a modified form of construction.

The present invention is applicable, generally, to pump cross heads or to connections between piston rods and cross heads, and since it is particularly useful as applied to an ordinary slush pump I have illustrated it in a typical form of slush pump. The particular pump illustrated in the drawings involves, generally, a base or bed A carrying a frame structure B which supports a drive shaft C, a head slide D, a cylinder block E, and various other like elements. A cam 10 is carried on the shaft C and operates a crank arm 11 with the cross head 12. The cylinder block E includes a cylinder 14 in which a piston 15 operates and a piston rod 16 connects the piston 15 and the cross head 12. The piston rod 16 may be fixed to or connected with the piston 15 in any suitable manner.

The present invention is concerned primarily with the connection between the piston rod 16 and the cross head 12 and in the form of the invention shown in Figs. 1 to 6 inclusive the construction includes a socket 20 in the cross head 12 receiving the end portion 21 of the piston rod 16, means 24 releasably coupling the cross head 12 and rod 16, lock means 22 locking the rod portion 21 in the socket 20, and retaining means 23 for the lock means 22.

The socket 20 is shown entering the cross head 12 from the end 25 which faces the cylinder 14 and it is an opening in the cross head generally round in cross section and having a flat bottom 26.

The end portion 21 of the piston rod 16 is generally round in cross section and such as to extend into the socket 20, and it has a flat end 27 to engage or seat on the bottom 26 when the rod and cross head are coupled. The means 24 releasably coupling the head and the end portion 21 of the rod 16 involves series of thread-like projections 30 on the exterior of the rod portion 21 cooperating with series of thread-like projections 31 on the inner wall of the socket 20. The projections 30 and 31 are thread-like, that is, they are helically pitched and may be shaped like coarse threads, as shown throughout the drawings.

In the particular form of the invention illustrated there are two series of projections 30 on the exterior of the rod portion 21 and the projections of each series extend substantially 90° around the portion 21. There is a corresponding number of series of projections 31 on the interior of the socket 20 and they extend substantially 90° around within the socket. With this interrupted thread-like construction the end portion 21 of the rod 16 can be freely inserted into the socket 20 until the end 27 of the rod is near the bottom 26 of the socket by positioning the rod relative to the cross head so that the series of projections 30 pass between the series of projections 31.

With the rod portion 21 engaged the desired distance in the socket rotation of the rod will cause the thread-like projections 30 and 31 to engage and the pitch of the projections will cause the rod portion to move inwardly in the socket until the end 27 of the rod seats against the bottom 26 of the socket. It is to be understood that the parts are so related and proportioned as to cause the end 27 of the rod to seat on the bottom 26 of the socket when the projections 30 and 31 are fully engaged. It will be apparent from the drawings that the series of projections 30 and 31 may extend the entire length of the socket and the entire length of the rod portion 21 and it is preferred that the series of projections extend parallel with the longitudinal axis of the socket and rod portion.

The lock means 22 includes one or more lock keys 40 shaped and proportioned for introduction into the socket around the rod portion 21 and between the engaged series of projections 30 and 31. As shown in Fig. 3 of the drawings, the keys are preferably arcuate or curved in cross section to conform to the contour of the socket and rod portion and they correspond in circumferential extent with the openings left in the socket and around the rod portion 21 when the projections 30 and 31 are fully engaged.

In the preferred form of the invention the keys 40 are joined together or carried by a ring 41 which is such as to slidably pass or engage over the rod 16. The ring 41 is shaped and proportioned to bear against the end 25 of the cross head when the keys 40 are fully engaged with the cross head and rod.

The retaining means 23 provided for holding the lock means against displacement may be any suitable means serving to releasably hold the lock means in place. In the form of the invention shown in Figs. 1 to 6 of the drawings the retaining means involves a snap ring 45 engaged in a groove or recess 46 formed in or around the rod 16 where the end portion 21 of the rod joins the main portion thereof. The ring 45 is preferably a split ring of substantial proportions and stiff enough so that it will not accidentally become disengaged from the holding or receiving groove 46. The parts are arranged and proportioned so that when the snap ring 45 is engaged in the groove 46 it engages the key carrying ring 41 holding the ring 41 against the end 25 of the cross head.

To operate or engage the structure that I have provided it is merely necessary to slide the rod portion 21 into the socket and then turn it through about 90° to fully engage the projections 30 and 31. Following this the keys 40 are slid into place, whereupon the snap ring 45 may be applied to the rod finally securing the entire structure in position ready for operation. The connection established through the structure of the present invention is secure and dependable and will not become released until the snap ring 45 is removed, following which the keys 40 may be removed, allowing the end portion 21 of the rod to be rotated to disengage the projections 30 and 31.

In the form of the invention illustrated in Fig. 7 of the drawings the socket 20ᵃ instead of being formed directly in the cross head 12ᵃ is formed in a sub or extension 50 of the cross head. A threaded socket 51 is provided in the cross head receiving a threaded pin 52 which projects from the sub 50. The sub has a shoulder 53 which seats against the end 25ᵃ of the cross head when the sub is fully engaged with the cross head. The structure just described is preferably made tight on the cross head so that the sub is, in effect, an extension thereof.

The socket 20ᵃ in the sub 50 receives the end portion 21ᵃ of the piston rod 16ᵃ and these parts may be releasably coupled by interrupted thread construction the same as that above described. The structure may further include lock means 22ᵃ which may correspond in form and construction with the lock means 22 hereinabove described. The retaining means 23ᵃ shown in Fig. 7 is somewhat different than the retaining means first described, in that it involves merely a lock nut 45ᵃ threaded on the rod 16ᵃ so that it may be tightened against the lock means 22ᵃ in order to hold the lock means in engaged or operating position.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In a slush pump, a cross head, a guide supporting the cross head for reciprocation and against rotation and having a socket therein, drive means reciprocating the cross head, a cylinder in fixed position relative to the guide, a piston operating in the cylinder, a rod carrying the piston and projecting from the cylinder, means releasably coupling the rod to the cross head including circumferentially spaced longitudinally disposed rows of pitched projections in the socket and circumferentially spaced longitudinally disposed rows of pitched projections on the rod entered in the socket and cooperatively engaged with the first mentioned projections by rotation of the rod relative to the cross head, an annular member on the rod bearing on the cross head, keys rigid with and projecting from the annular member and extending into the socket between the engaged projections, and a releasable retainer holding the annular member in engagement with the cross head.

2. In a slush pump, a cross head, a guide supporting the cross head for reciprocation and against rotation and having a socket therein, drive means reciprocating the cross head, a cylinder in fixed position relative to the guide, a piston operating in the cylinder, a rod with a circumferential groove therein, and carrying the piston and projecting from the cylinder, means releasably coupling the rod and cross head including circumferentially spaced longitudinally disposed rows of pitched projections in the socket and circumferentially spaced longitudinally disposed rows of pitched projections on the rod entered in the socket and cooperatively engaged with the first mentioned projections by rotation of the rod relative to the cross head, an annular member on the rod bearing on the cross head, keys rigid with and projecting from the annular member and extending into the socket between the engaged projections, and a split resilient ring releasably engaged in the groove in the rod and engaging the annular member to hold it in bearing engagement with the cross head.

CHARLES J. CARR.

REFERENCES CITED

The following references are of record in the file of this patent:

UNITED STATES PATENTS

| Number | Name | Date |
|---|---|---|
| 1,469,009 | Overstreet | Sept. 25, 1923 |
| 1,671,458 | Wilson | May 29, 1928 |
| 1,813,998 | Hobart | July 14, 1931 |
| 1,977,075 | Magnuson | Oct. 16, 1934 |
| 2,416,852 | Schaaff et al. | Mar. 4, 1947 |
| 2,439,958 | Anderson | Apr. 20, 1948 |